US012671742B2

(12) United States Patent　　(10) Patent No.:　US 12,671,742 B2
Harrigan et al.　　(45) Date of Patent:　Jun. 30, 2026

(54) DIGITAL ASSET TRANSFER BASED ON A UNIQUE PHYSICAL TOKEN

(71) Applicant: PAYPAL, INC., San Jose, CA (US)

(72) Inventors: Mary Harrigan, New York, NY (US); Max Robert Gabreski, Peoria, AZ (US); Scott Southwood, Kihei, HI (US); Lindsay Boland, Chicago, IL (US); Clifford Harrington, Piedmont, CA (US)

(73) Assignee: PayPal, Inc., San Jose, CA (US)

( * ) Notice: Subject to any disclaimer, the term of this patent is extended or adjusted under 35 U.S.C. 154(b) by 287 days.

(21) Appl. No.: 18/213,496

(22) Filed: Jun. 23, 2023

(65) Prior Publication Data

US 2024/0430329 A1　　Dec. 26, 2024

(51) Int. Cl.
| | |
|---|---|
| *H04L 67/146* | (2022.01) |
| *G06F 3/0484* | (2022.01) |
| *G06K 7/14* | (2006.01) |
| *G06Q 20/06* | (2012.01) |
| *G06Q 20/36* | (2012.01) |
| *H04L 67/02* | (2022.01) |
| *G06Q 20/34* | (2012.01) |
| *G06Q 20/40* | (2012.01) |

(52) U.S. Cl.
CPC .......... *H04L 67/146* (2013.01); *G06F 3/0484* (2013.01); *G06K 7/1417* (2013.01); *G06Q 20/06* (2013.01); *G06Q 20/36* (2013.01); *H04L 67/02* (2013.01); *G06Q 20/342* (2013.01); *G06Q 20/405* (2013.01)

(58) Field of Classification Search
None
See application file for complete search history.

(56) References Cited

U.S. PATENT DOCUMENTS

| | | | |
|---|---|---|---|
| 11,157,898 B2 * | 10/2021 | Mutter | G06Q 20/3829 |
| 2006/0235803 A1 * | 10/2006 | Romney | G06Q 30/06 |
| | | | 705/65 |
| 2007/0215685 A1 * | 9/2007 | Self | G06Q 30/06 |
| | | | 235/375 |
| 2008/0283589 A1 * | 11/2008 | Rapf | G07D 7/0047 |
| | | | 235/379 |
| 2010/0325897 A1 * | 12/2010 | Chu | B26B 1/046 |
| | | | 30/161 |

(Continued)

OTHER PUBLICATIONS

International Search Report and Written Opinion of application No. PCT/US24/35080, dated Sep. 20, 2024, 8 pp.

*Primary Examiner* — Lashonda Jacobs-Burton
(74) *Attorney, Agent, or Firm* — Greenberg Traurig, LLP

(57) ABSTRACT

A method for transferring a digital asset from a first user to a second user includes the first user's computing device scanning a token on physical media, such as a QR code on a greeting card, to launch a digital asset transfer interface. In the interface, the first user identifies a digital asset to be transferred, and the digital asset is transferred from the first user's account or other digital storage to a digital escrow. The first user conveys the physical media to a second user. The second user scans the same token to launch the digital asset transfer interface and is presented with the digital asset and a greeting or other content selected by the first user. The second user selects a destination account, and the digital asset is transferred from escrow to the destination account.

20 Claims, 6 Drawing Sheets

(56) References Cited

U.S. PATENT DOCUMENTS

| | | | |
|---|---|---|---|
| 2011/0106698 A1* | 5/2011 | Isaacson | G06Q 30/02 |
| | | | 705/41 |
| 2013/0041814 A1* | 2/2013 | Ankarath | G06Q 40/00 |
| | | | 705/39 |
| 2013/0080321 A1* | 3/2013 | Mulhall | G06Q 30/02 |
| | | | 705/41 |
| 2015/0066757 A1* | 3/2015 | Shenoy | G06Q 20/3274 |
| | | | 705/41 |
| 2015/0206135 A1* | 7/2015 | Scipioni | G06Q 20/36 |
| | | | 705/41 |
| 2015/0248664 A1 | 9/2015 | Makhdumi | |
| 2015/0348018 A1* | 12/2015 | Campos | G06Q 20/18 |
| | | | 705/41 |
| 2016/0012465 A1* | 1/2016 | Sharp | G06Q 20/321 |
| | | | 705/14.17 |
| 2016/0019532 A1* | 1/2016 | Isaacson | G06Q 20/342 |
| | | | 705/39 |
| 2017/0147808 A1* | 5/2017 | Kravitz | H04L 9/3268 |
| 2018/0330342 A1* | 11/2018 | Prakash | H04L 9/50 |
| 2019/0001732 A1* | 1/2019 | Ongsitco | B42D 15/022 |
| 2019/0303921 A1 | 10/2019 | Mutter | |
| 2020/0005293 A1* | 1/2020 | Opeola | G06Q 20/065 |
| 2020/0349663 A1* | 11/2020 | Quadros | G06Q 20/405 |
| 2020/0394651 A1 | 12/2020 | Kreder, III | |
| 2021/0359989 A1* | 11/2021 | Dunjic | H04L 9/0891 |
| 2022/0114571 A1* | 4/2022 | Ortiz | G06Q 20/36 |
| 2022/0114584 A1* | 4/2022 | Conley | G06Q 20/3674 |
| 2022/0222737 A1* | 7/2022 | Pronski | G06Q 20/085 |
| 2022/0292588 A1* | 9/2022 | Collen | H04L 9/3213 |
| 2022/0358485 A1* | 11/2022 | Bhasin | G06Q 20/405 |
| 2022/0366495 A1* | 11/2022 | Gottehrer | G06F 21/64 |
| 2023/0070389 A1* | 3/2023 | Madhusudhan | G06Q 10/083 |
| 2023/0123453 A1* | 4/2023 | Swanson | G09F 3/0297 |
| | | | 358/1.13 |
| 2023/0124984 A1* | 4/2023 | Swanson | B42D 15/042 |
| | | | 235/494 |
| 2023/0135814 A1* | 5/2023 | Goodman | G06Q 30/0185 |
| | | | 705/26.5 |
| 2023/0252703 A1* | 8/2023 | Swanson | B42D 15/025 |
| | | | 715/202 |
| 2023/0267452 A1* | 8/2023 | Isogawa | G06Q 20/405 |
| | | | 705/75 |
| 2023/0298064 A1* | 9/2023 | Whitt | G06Q 20/389 |
| | | | 705/14.13 |
| 2023/0419276 A1* | 12/2023 | Agarwal | G06Q 20/10 |
| 2024/0005325 A1* | 1/2024 | Agarwal | G06Q 20/36 |
| 2024/0086384 A1* | 3/2024 | Soon-Shiong | G06F 16/2255 |
| 2024/0202763 A1* | 6/2024 | Kang | G06Q 30/0214 |
| 2024/0275597 A1* | 8/2024 | Covalucci | H04L 9/30 |
| 2024/0289809 A1* | 8/2024 | Srivastava | G06Q 20/02 |
| 2024/0289906 A1* | 8/2024 | Williams | G06F 21/64 |
| 2024/0403943 A1* | 12/2024 | Swanson | H04L 67/02 |
| 2025/0069095 A1* | 2/2025 | Randhawa | G06Q 30/0185 |

* cited by examiner

300

302 — Cause one or more codes to be added to physical media

304 — Store the one or more unique codes

306 — Receive scan of first unique code from first user device

308 — Provide digital asset transfer interface to first user device

310 — Receive user identification of first digital asset

312 — Transfer first digital asset from first user's account to escrow account

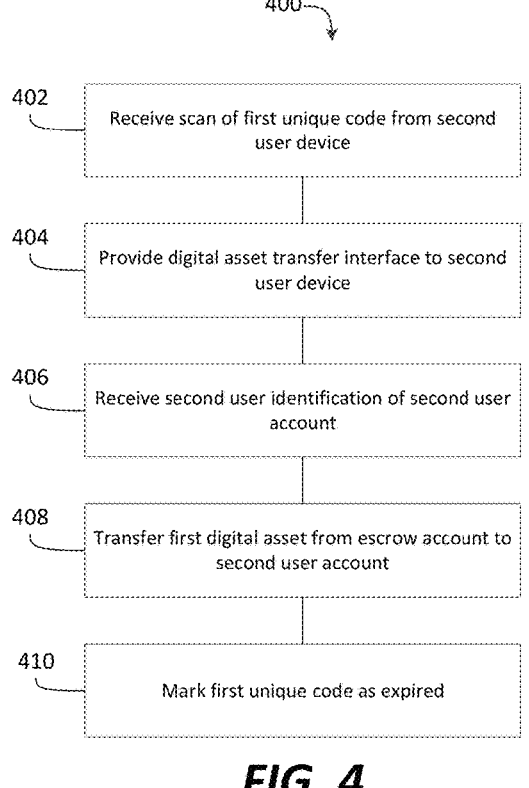

400

402
Receive scan of first unique code from second user device

404
Provide digital asset transfer interface to second user device

406
Receive second user identification of second user account

408
Transfer first digital asset from escrow account to second user account

410
Mark first unique code as expired

FIG. 4

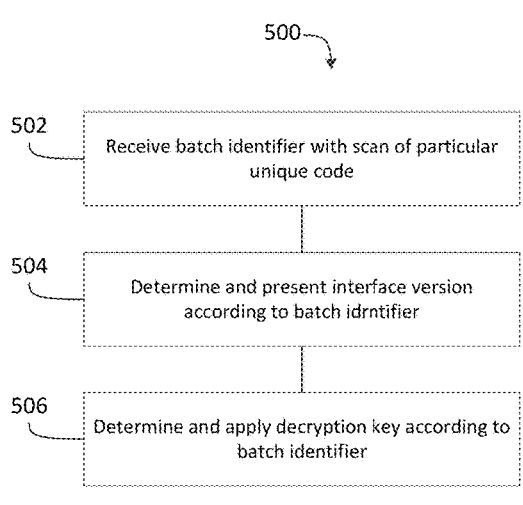

500

502
Receive batch identifier with scan of particular unique code

504
Determine and present interface version according to batch idrntifier

506
Determine and apply decryption key according to batch identifier

FIG. 5

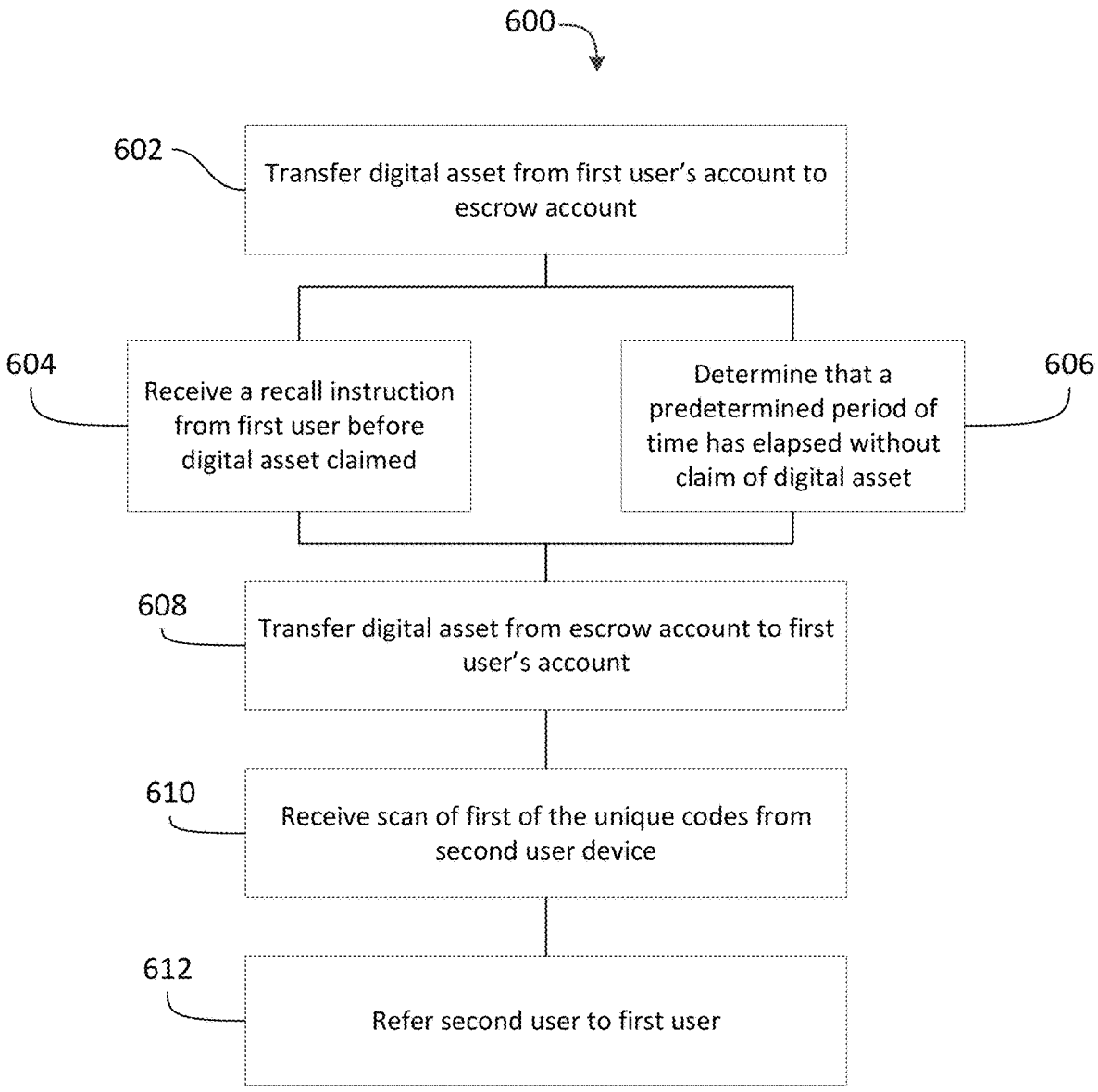

600

602 — Transfer digital asset from first user's account to escrow account

604 — Receive a recall instruction from first user before digital asset claimed

606 — Determine that a predetermined period of time has elapsed without claim of digital asset 608 — Transfer digital asset from escrow account to first user's account 610 — Receive scan of first of the unique codes from second user device 612 — Refer second user to first user

FIG. 6

DIGITAL ASSET TRANSFER BASED ON A UNIQUE PHYSICAL TOKEN

TECHNICAL FIELD

The instant disclosure relates to digital asset transfer based on a user scan of a unique token included in physical media.

BACKGROUND

Greeting cards generally include a greeting message, and a user can insert cash, a gift card, a check, or other gift. To electronically convey a gift, a user can order an electronic gift card from a vendor, which the vendor typically emails to the recipient after the gifting user instructs the order. Still further, users can transfer currency or files to each other through email or by instructing a transfer through a payment or file transfer application or platform.

BRIEF DESCRIPTION OF THE DRAWINGS

FIG. 4 is a flow chart illustrating an example method of a second portion of a digital asset transfer based on a physical token.

FIG. 5 is a flow chart illustrating an example method of transferring a plurality of digital assets according to one or more batch identifiers.

FIG. 6 is a flow chart illustrating an example method of undoing a first portion of a digital asset transfer.

DETAILED DESCRIPTION

Known methods and systems for exchanging digital assets between users do not adequately balance security and flexibility of conveyance. For example, a gift card can be included in a greeting card, but that gift card can be used by any holder and thus does not substantially protect against theft. Similarly, electronic gift cards can be ordered from a vendor for the vendor to email to a recipient, but such electronic gift cards do not provide significant options in how to convey the gift card to the recipient. In contrast, the instant disclosure provides secure and flexible approaches for transferring a digital asset from one user to another, by including a unique code in a physical media token that a first user scans to designate a digital asset for transfer, and a second user scans to claim the digital asset. Because the token is incorporated into physical media, it can be conveyed to the second user at the time, place, and manner of the first user's choosing. And because the digital asset transfer occurs through a staged process conducted by a back-end system, robust security measures can be included to ensure that the digital asset is claimed only by the intended recipient and that the unique code is not otherwise subject to fraud or abuse.

Figure 1:
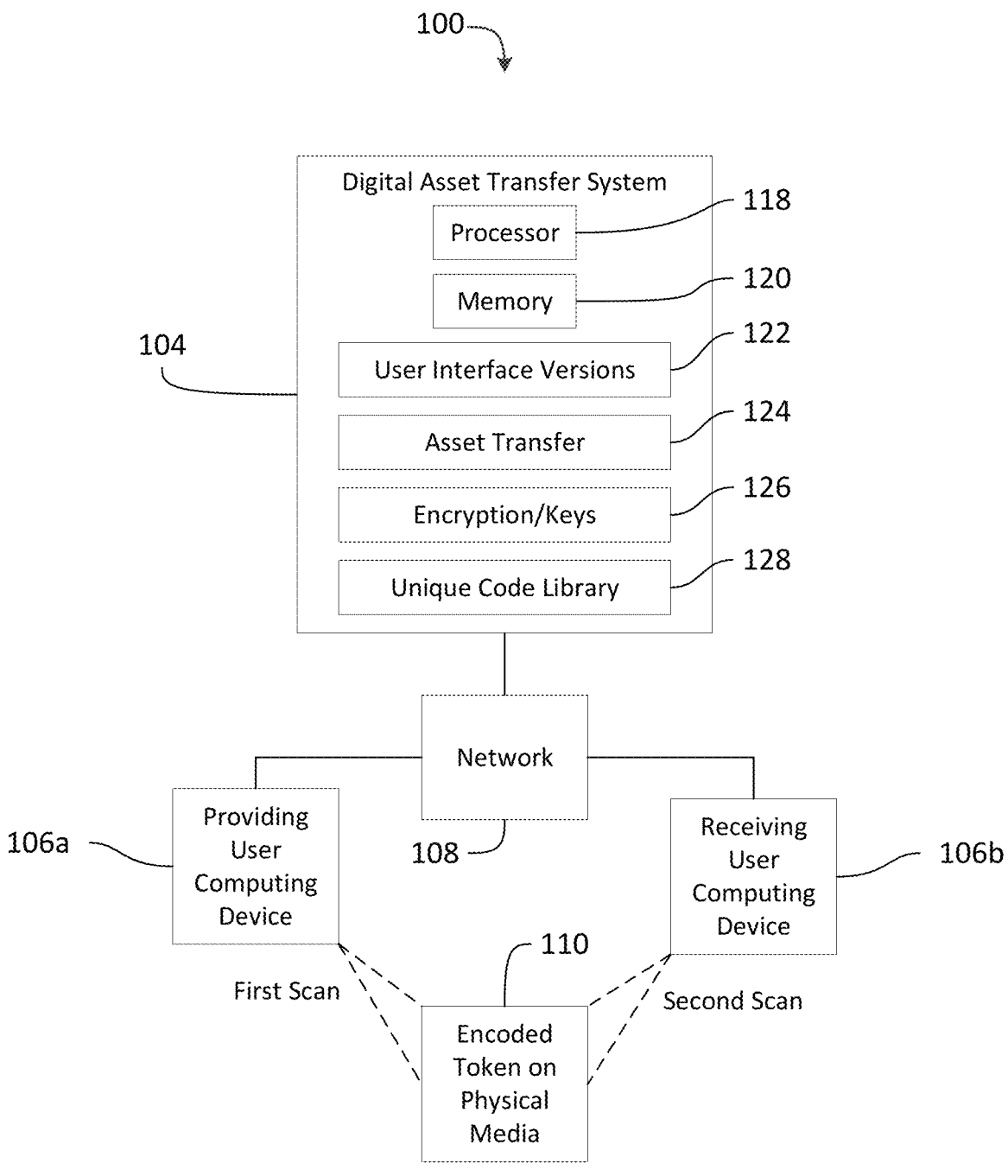
FIG. 1 is a block diagram view of an example system for transferring a digital asset based on a physical token.

Referring to the drawings, wherein like reference numerals refer to the same or similar features in the various views, FIG. 1 is a block diagram view of an example system 100 for transferring digital assets according to physical tokens, such as printed tokens applied to physical media. The system 100 may include a digital asset transfer system 102, a plurality of computing devices 104a, 104b (which may be referred to individually as a user computing device 104 or collectively as the user computing devices 104) in communication with the digital asset transfer system 102 and with each other over a network 106, and an encoded token on physical media 108 (which may be referred to herein as the token 108).

As will be described below, the user computing devices 104 may scan the same encoded token 108 in order to effect a transfer of a digital asset from one user to another. In the transfer, a first user may provide the digital asset, and may therefore be referred to herein as the "providing user", and a second user may receive the digital asset from the first user, and may therefore be referred to herein as the "receiving user." Accordingly, digital asset transfer system 102 may have access to a providing user account associated with the providing user, a receiving user account associated with the receiving user, and an escrow account in which one or more digital assets may be stored while awaiting transfer to one or more receiving users. The escrow account may be or may include a common digital repository for a plurality of digital assets from various providing users awaiting transfer to various receiving users. Further, the first user computing device 106a may have access to (and control over) the providing user account, and the second user computing device 106b may have access to (and control over) the receiving user account. Each account may be a respective digital file storage.

The digital asset transfer system 102 may include a processor 110 and non-transitory, computer readable memory 112 storing instructions that, when executed by the processor 110, cause the digital asset transfer system 102 to perform one or more of the steps, processes, methods, operations, etc. described herein with respect to the digital asset transfer system 102. The digital asset transfer system 102 may include one or more functional modules and data embodied in the memory 112. The functional modules and data may include one or more user interface versions 114, an asset transfer module 116, an encryption and key management module 118, and a unique code library 120.

The digital asset transfer system 102 may provide an electronic user interface with which the user computing devices 104 may interact to effect a digital asset transfer. For example, upon scanning a unique token 108, a user computing device 104 may be provided a particular version of the electronic user interface. The particular version may be selected from among the user interface versions 114 according to information encoded or otherwise embedded in the token 108, for example. Accordingly, the digital asset transfer system may store a plurality of user interface versions 114, in some embodiments. Different versions of the user interface 114 may offer identical or similar functionality, but may differ from each other in appearance and content. For example, different versions may include different backgrounds, different animations, or different arrangements of content or input portions. In another example, different versions may be used to facilitate transfer of different types of digital assets. Example operations of the asset transfer module 116 will be described in detail below with respect to FIGS. 3-6.

A digital asset according to the present disclosure may include, for example, a digital file, a non-fungible token (NFT), cryptocurrency, currency, and/or another type of digital asset, for example (or a combination of digital asset types).

The encryption and key management module 118 may include storage of a plurality of cryptographic keys and functionality for encoding and decoding information according to those keys. For example, in an embodiment, the plurality of cryptographic keys may include one or more public keys, which public keys may be distributed to one or more third parties for encrypting information into digital tokens and a corresponding one or more private keys, which private keys may be held only by the encryption and key management module 118 for decrypting information included in a unique token.

The unique code library 120 may include a listing of a plurality of unique codes, and a cross-reference of the plurality of unique codes with other respective information. Each unique code of the plurality of unique codes may have been applied to a respective item of physical media, in some embodiments. Each unique code may be associated with one or more respective data, such as a status or state (e.g., unfunded, funded, claimed, cancelled, or expired), a batch identifier indicating a group of codes to which a particular code belongs, an expiration time, identifying information respective of one or more associated users (e.g., a providing user once the code has been funded, identifying information of an intended receiving user), and/or other information.

The unique code library may store a respective state of each unique code, in some embodiments. Such states may include, for example, unfunded, funded, claimed, cancelled, expired. An unfunded state may indicate that a unique code has not yet been used by a first user to transfer a digital asset from the first user's account to an escrow account. A funded state may indicate that a first user has used a unique code to transfer a digital asset from the first user's account to an escrow account, but that digital asset has not yet been claimed by a second user. A claimed status may indicate that a first user has used a unique code to transfer a digital asset from the first user's account to an escrow account and a second user has used the unique code to claim the digital asset and transfer it from the escrow account to the second user's account. A cancelled state may indicate that a first user has cancelled the transfer associated with the unique code, or that a transfer associated with the unique code has otherwise been cancelled before being claimed. An expired status may indicate that a first user has used a unique code to transfer a digital asset from the first user's account to an escrow account, but the digital asset has not been claimed within a predetermined expiration time. The respective state stored in connection with a unique code may be used by the digital asset transfer system 102 when a user scans the code. If the state of the code is unfunded, the user may be assumed to be a first, providing user and may be presented an interface for funding the unique code. If the state of the code is funded, the user may be assumed to be a second, receiving user and may be presented an interface for claiming the digital asset provided by the first user. If the state of a code is claimed, cancelled, or expired, the scanning user may be prevented from receiving any digital asset. Instead, the scanning user may be referred to the first user associated with the code or otherwise redirected.

Figures 2A, 2B:
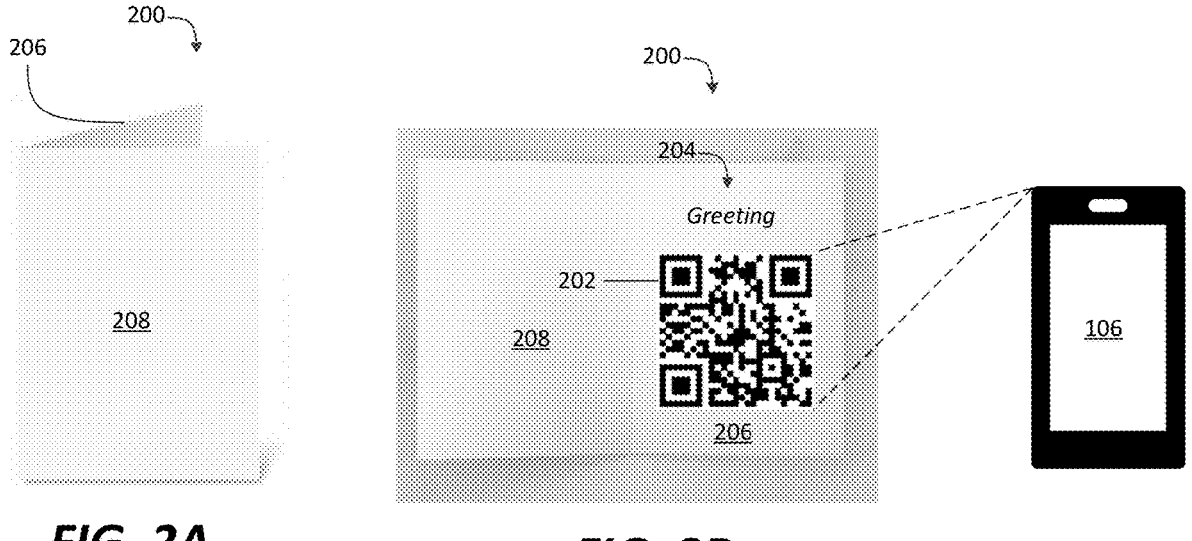
FIGS. 2A and 2B illustrate a token applied to physical media.

FIGS. 2A and 2B illustrate an example physical media 200 with a unique token 202 printed on the physical media 200. The unique token 202 is an embodiment of the unique token 108 of FIG. 1. As illustrated, the physical media 200 may be a greeting card, and thus may include a greeting 204 or other content. The physical media 200 may include a first portion 206 (e.g., a first page) on which the token 202 is printed or otherwise applied and a second portion 208 (e.g., a second page) that obscures the token 202 in a first state (e.g., a closed configuration). When the second portion 208 is moved to a second state (e.g., an open configuration as shown in FIG. 2B), the token 202 may be visible or otherwise accessible to a user.

The token 202 may include a visible, machine-readable encoded format, such as a quick response (QR) code or bar code, in some embodiments. Additionally or alternatively, the token 202 may include a machine-readable transmitter, such as a radio-frequency identification (RFID) tag or near-field communications (NFC) tag. Additionally or alternatively, the token 202 may include human-readable information, such as a URL and redemption code. As shown in FIG. 2B, a user may use a scanning device (e.g., a camera, an NFC receiver, an RFID receiver, a bar code scanner, etc.) of a user computing device 104 to scan the token 202. For example, the camera of the user computing device 104 may capture an image of the token 202, and the user computing device 104 may therefore receive an image of the token 202. The user computing device 104 may interpret the token 202 in response to the scan and may transmit a request according to information embedded in the token. The information may include, for example, a URL and a unique token identifier (which may be referred to herein as a unique code), in some embodiments. The information may further include a batch identifier, in some embodiments. A common batch identifier may be shared by multiple unique identifiers (i.e., a plurality of unique identifiers may be in a batch), in some embodiments.

The physical media 200 may include a greeting card, as illustrated in FIGS. 2A and 2B, in some embodiments. Alternatively, the physical media 200 may include a gift card, fob, or other physical format appropriate for having a token disposed in or on the physical media 200.

In some embodiments, the information embedded in the token 202 may include an encrypted URL (which may be, or may include, an electronic address of the digital asset transfer interface) and an instruction to launch a particular application that is capable of decrypting the URL. Accordingly, when the user computing device 106 scans the token 202, the user computing device 106 may launch the particular application, if the particular application is installed on the first user computing device. If the particular application is not installed on the first user computing device 106, the first user computing device 106 may be used to acquire the particular application.

Figure 3:
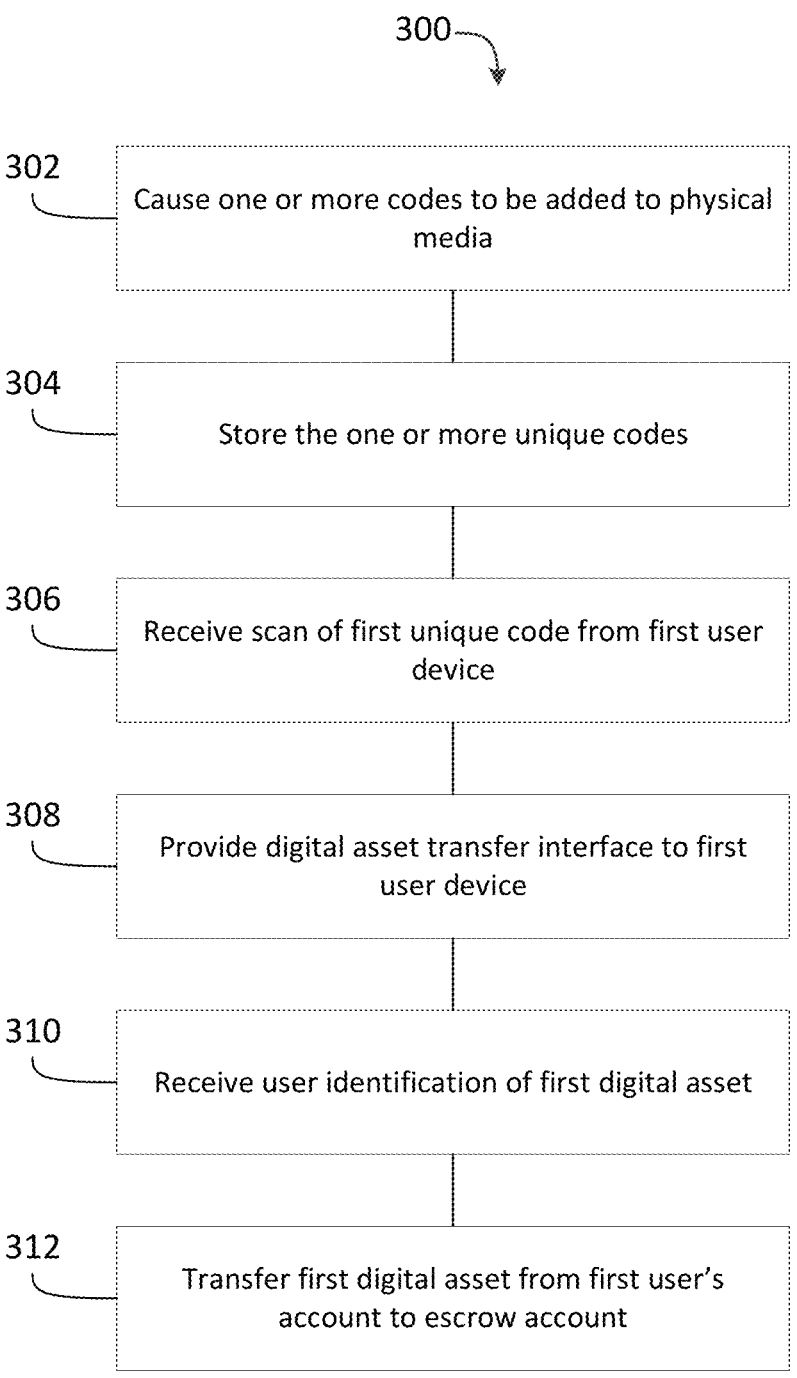
FIG. 3 is a flow chart illustrating an example method of a first portion of a digital asset transfer based on a physical token.

FIG. 3 is a flow chart illustrating an example method 300 of a first portion of a digital asset transfer based on a physical token. The method 300, or one or more portions of the method 300, may be performed by the digital asset transfer system 102, such as the functionality embodied in the asset transfer module 116, in some embodiments.

The method 300 may include, at block 302, causing one or more unique codes to be added to physical media. The unique codes may be added in the form of tokens in which the codes are embedded, for example. Block 302 may include, for example, causing a unique code to be added to a greeting card, gift card, fob, or other item of physical media. Block 302 may include, for example, transmitting the unique code for the unique code to be applied by a third party. Alternatively, block 302 may include receiving a unique code from a third party that has applied or will apply the unique code to an item of physical media.

In some embodiments, block 302 may include generating the token respective of the unique code, such as by generating the token based on the unique code as well as one or more of a batch identifier, a physical media type, and/or other information to be embedded in the token. Additionally or alternatively, block 302 may include encrypting the unique code, or providing a public key with which the unique code or information associated with the unique code can be encrypted to a third party, while storing an associated private key for later use decrypting information embedded in the token.

In some embodiments, block 302 may include causing a plurality of unique codes to be added to respective physical media. In such embodiments, block 302 may include causing each unique code of the plurality of unique codes to be added to a respective item of physical media, such that each unique code is added to a single respective item of physical media. For example, where one hundred unique codes are generated, each code may be added to a respective one of one hundred items of physical media.

Where a plurality of unique codes are used, each code may be associated with a respective one or more batches. Each batch may correspond to, for example, a particular theme of physical media (e.g., birthday greeting cards, holiday greeting cards, etc.), a particular creation date of the code, of the token encoding the code, or the physical media, or other grouping information. Additionally or alternatively, each batch may be associated with a physical media type (e.g., greeting card, gift card, fob, etc.), a token type (e.g., QR code, bar code, etc.), an identifier of a cryptographic key that may be used to decrypt the code, or other information. This associated information may be transmitted with the unique code at block 302, and/or used to generate the token for the unique code at block 302.

The method 300 may further include, at block 304, storing the one or more unique codes. As a result of block 304, a library of unique codes may be maintained (e.g., unique code library 120). Each unique code may be stored in conjunction with the associated information noted above (e.g., physical media type, token type, key identifier, batch identifier, etc.). As a result, each unique code may be stored with respective associated information.

The method 300 may further include, at block 306, receiving a scan of a first unique code of the one or more unique codes from a first user device. The first user device may have scanned a token, such as a QR code, bar code, RFID tag, etc., in which the first unique code is embedded. The first user device may also have interpreted the token to extract the first unique code from the token, as well as one or more other items of data. The first user device may transmit the first unique code and other data extracted from the token, and the transmitted information may be received, at block 306. As transmitted and received, the first unique code and/or other information embedded in the token may be encrypted. For example, in an embodiment, the token scanned by the first user device may encode or otherwise embed a non-encrypted URL (or other form of electronic address), an encrypted unique code, and other encrypted information associated with the unique code. Accordingly, block 306 may include receiving a request for an interface (e.g., page within a domain) at a URL, and the request may include an encrypted unique code and other associated information, which may or may not be encrypted.

The method 300 may further include, at block 308, providing a digital asset transfer interface or other electronic user interface to the first user device in response to receiving the scan of the first unique code. The digital asset transfer interface may be provided according to the unique code. For example, block 308 may include retrieving a state of the unique code and determining that the state is unfunded. In response, block 308 may include serving a provider interface version in which a first user can designate a digital asset for transfer. In another example, a version number may be stored in conjunction with the first unique code, and block 308 may include retrieving the stored version number and serving the corresponding interface version.

Additionally or alternatively, block 308 may include providing an interface version according to information received along with the unique code. In a first example, a version number may be received with the unique code at block 306, and a version of the interface may be served to the first user device according to the received version number. In another example, a batch identifier may be received with the unique code at block 306, and a version number may be stored in conjunction with the batch identifier, and block 308 may include retrieving the stored version number and serving the corresponding interface version.

The provided digital asset transfer interface may include one or more user input portions. A first of such input portions may enable the user of the first user device to identify a digital asset to be transferred to a recipient. A second of such input portions may enable the user of the first device to identify an intended recipient of the digital asset transfer. The A third of such input portions may enable the user to input a customized greeting or other message for the recipient. A fourth of such input portions may enable the user to select or provide a background, theme, artwork, or other aesthetic feature to be used when the interface is provided to the recipient of the digital asset.

The arrangement of the input portions may vary from version to version, or the particular input portions provided. For example, in a version related to unique codes included on greeting cards, the third input portion may be provided, but in a version related to unique codes included on fobs, the third input portion may be omitted. Further, the type(s) of digital assets accessible for identification may vary from interface version to interface version. For example, a first version of the interface may provide the first user computing device access to a currency account, whereas a second version of the interface may provide the first user computing device access to a file storage.

In some embodiments, block 308 may include providing the digital asset transfer interface by providing data to populate a portion of the interface of the particular application that was launched on the first user computing device in response to scanning the token.

In some embodiments, the first user may be required to have an account associated with the digital asset transfer interface in order to transfer the digital asset. Accordingly, if the first user does not already have an account, the first user may be prompted to create an account at block 308. In the course of creating the account, the first user may be required to provide certain identifying information, such as a name, phone number, email address, physical address, etc.

The method 300 may further include, at block 310, receiving a user identification of a first digital asset. The user identification received at block 310 may be received via a user interface portion in the electronic user interface provided at block 308. The user may identify, and block 310 may include receiving, for example, a source storage of the digital asset along with the identification of the asset itself. For example, the first user may identify an amount of currency and source account, a non-fungible token and source storage, a file and source storage, a cryptocurrency amount and source account, etc. In some embodiments, block 310 may include receiving identifying information respective of the receiving user from the first user, such as a name, email address, phone number, etc. of the intended receiving user.

The method 300 may further include, at block 312, transferring the identified first digital asset from the user's account or other source storage to an escrow account or other escrow storage. The escrow storage may be a common repository (e.g., common account or other storage) for holding digital assets intended for transfer from one user's storage to another user's storage and, in some embodiments, for other escrow purposes. In the escrow storage, digital assets from different users may be commingled. Block 312 may further include changing a stored state of the unique code from unfunded to funded.

The method 300 may enable a first user to provide a digital asset for transfer to a second user in connection with a physical token. Accordingly, the method 300 may be performed to facilitate the first user's provision of the digital asset, and then the first user may provide the physical token to the second user (e.g., by mailing a greeting card including the token to the second user). The method 400, discussed below, may then be performed to transfer the digital asset to the second user once the second user receives and interacts with the physical token.

The method 300 of FIG. 3 may be executed in parallel for a plurality of codes, a plurality of physical media, and a plurality of first users. Accordingly, a plurality of unique codes may be applied to a plurality of respective physical media according to block 302, and the plurality of codes may be stored in connection with respective information at block 304. Respective scans of the plurality of unique codes may be received according to block 306, and one or more versions may be provided in response to the scanning first users according to block 308. Each first user may identify a respective digital asset according to block 310, and those digital assets may be stored in a common escrow storage according to block 312.

FIG. 4 is a flow chart illustrating an example method of a second portion of a digital asset transfer based on a physical token. The method 400, or one or more portions of the method 400, may be performed by the digital asset transfer system 102, such as the functionality embodied in the asset transfer module 116, in some embodiments.

The method 400 may include, at block 402, receiving a scan of a unique code from a second user device. The unique code may be the same unique code that was scanned and received at block 306, scanned off of the same physical media and in the same manner, by the second user computing device as the first user computing device.

The method 400 may further include, at block 404, providing the digital asset transfer interface to the second user device in response to receiving the scan at block 402. The interface may be provided according to the received unique code. For example, block 404 may include retrieving a state of the received unique code and determining that the unique code has a funded status. In response to determining that the unique code has a funded status, block 404 may include serving a receiving user version of the digital asset transfer interface. In another example, as similarly described above with respect to block 306, a particular version may be served to the second user device according to a version number received at block 402, according to a version number stored in conjunction with the received unique code, according to a batch identifier received with the unique code at block 402, etc. Also as noted above, versions may differ from each other with respect to content, arrangement, input portions, etc.

The digital asset transfer interface may be hosted in the same domain and/or provided in the same application as the interface presented to the first user computing device at block 308, and thus may be considered the same electronic user interface. However, the input portions and details of the interface may be different. For example, the interface presented to the second user computing device may identify the digital asset to be transferred to the second user, may identify the provider of the digital asset, and may further include a first input portion for selecting a destination storage for the digital asset. The interface presented at block 404 may include specific content identified by the first user computing device, such as a theme, background, greeting message, etc.

In some embodiments, the interface presented at block 404 may include a portion requiring the second user to identify themself to ensure that the second user computing device is the same as the recipient identified by the first user. Such identification may include, for example, an account login, a name, a phone number, an email address, etc. In some embodiments, a confirmation code or other proof of possession may be sent to the phone number, email address, etc. provided by the second user and solicited back from the second user computing device. If the user identification information provided by the second user computing device does not match the recipient information provided by the first user, then the second user may be denied access to the digital asset intended for the recipient, and the first user may be notified of the attempted access and may be provided with the information of the second user that attempted to access the digital asset or one or more other security measures.

In some embodiments, the second user may be required to have an account associated with the digital asset transfer interface in order to receive the digital asset. Accordingly, if the second user does not already have an account, the second user may be prompted to create an account at block 404. In the course of creating the account, the second user may be required to provide certain identifying information that may be used to confirm that the second user is the intended recipient identified by the first user.

The method 400 may further include, at block 406, receiving an identification, from the second user computing device, of a receiving user storage, such as a second user account. The identification may be received via an input portion provided in block 404.

The method 400 may further include, at block 408, transferring the digital asset from the escrow storage to the second user storage identified in block 406 and, at block 410, marking the unique code as claimed. Marking the unique code as claimed may include altering data in the data store of block 304. Once marked as claimed, a unique code may no longer be used. For example, if a third user scans an claimed unique code, the third user may be informed that the unique code has been claimed and cannot be used. In the same example, the third user's information may be recorded for later use in fraud detection.

In an example of methods 300, 400, a first user may acquire a greeting card (such as illustrated in FIGS. 2A and 2B) and open the greeting card to scan a token printed on the greeting card with a camera of the user's mobile device. The first user's mobile device may interpret the token to extract an instruction to launch a particular application. In that application, an interface may be displayed that solicits identification of a digital asset, such as an amount of currency, from the user and a source of that digital asset. The user may input a digital asset, such as an amount of currency, and identify a source account, which source account may already be known to the particular application, and a recipient (e.g., by name, phone number, etc.). The identified recipient may already be linked to the user in the particular application. The identified amount of currency may be withdrawn from the first user's account and deposited into an escrow account. The first user may then re-seal the greeting card and send the greeting card to a second user. Upon receipt, the second user may open the greeting card and scan the token with their mobile device. The second user's mobile device may interpret the token to extract an instruction to launch the particular application. In that application, the second user's identity may be verified and matched to the recipient identified by the first user, and the second user may specify a recipient account into which the amount of currency from the first user should be deposited, which recipient account may already be known to the particular application. In some embodiments, the recipient may also be required to identify the provider (i.e., first user) as an additional fraud and theft prevention measure. The currency provided by the first user may then be withdrawn from the escrow account and deposited into the second user's account. Accordingly, the methods 300, 400 provide a simple and secure way for users to convey digital assets to one another.

FIG. 5 is a flow chart illustrating an example method of transferring a plurality of digital assets according to one or more batch identifiers. The method 500, or one or more portions of the method 500, may be performed by the digital asset transfer system 102, such as the functionality embodied in the asset transfer module 116, in some embodiments.

The method 500 may include, at block 502, receiving a batch identifier with a scan of a particular unique code. As noted above, a batch identifier may be common to a plurality of unique codes and, as detailed below, that batch identifier may be used to create a common experience or common functionality for the unique codes of the batch, as discussed below.

The method 500 may further include, at block 504, determining and presenting a version of the digital asset transfer interface according to the batch identifier. The batch identifier may signify, for example, a type of greeting card to which a unique code has been applied, such as a holiday card, a birthday card, a congratulations card, etc. Accordingly, the associated version may include a particular greeting, artwork, theme, or other content related to the type of greeting card. In another example, the batch identifier may signify a type of physical media to which the unique code was applied (e.g., a greeting card, a fob, etc.). Accordingly, the associated version may include particular security measures best-suited for the type of physical media. In yet another example, a batch identifier may be associated with a particular third party (e.g., a manufacturer of the physical media to which the unique code is applied), and block 504 may include presenting an interface version that includes information about that third party (e.g., a name, logo, etc. of the third party). Any of these interface version features based on a batch identifier may be combined, in embodiments.

The method 500 may further include, at block 506, determining and applying a decryption key according to the received batch identifier. For example, in some embodiments, the token scanned by a user computing device may encode or otherwise embed a URL or first URL portion (e.g., domain) and a batch identifier in a non-encrypted fashion, and additional information, such as a unique code, a second URL portion (e.g., page within the domain), and/or additional information, in an encrypted fashion. The batch identifier may be stored in conjunction with a particular decryption key, and that key may be selected from among a plurality of decryption keys, each associated with a respective batch, and used to decrypt the encrypted information received with the batch identifier. A selected decryption key may be a private key that is associated with a respective public key that was used by a third party to encrypt the unique code or another key that was used to encrypt the unique code.

In some embodiments, a batch identifier may be used for broader security measures. For example, if a key associated with a particular batch is found to be compromised, then the remaining unique codes in that batch may be automatically marked as cancelled.

FIG. 6 is a flow chart illustrating an example method of undoing a first portion of a digital asset transfer. The method 600, or one or more portions of the method 600, may be performed by the digital asset transfer system 102, such as the functionality embodied in the asset transfer module 116, in some embodiments.

The method 600 may find use in connection with the method 300 where, after the first user's identified digital asset is transferred to escrow storage, the transfer is to be withdrawn.

The method 600 may include, at block 602, transferring a digital asset from a first user's account or other storage to an escrow account or other escrow storage. Block 602 may be substantially similar to block 312 of the method 300, in some embodiments.

The method 600 may further include, at block 604, receiving a recall instruction from the first user before the digital asset is claimed by a second user. The recall instruction may be received, for example, through the same digital asset transfer interface through which the first user identified the digital asset. The recall instruction may be transmitted by the first user for any reason and may be a cancellation, for example.

The method 600 may further include, at block 606, determining that a predetermined period of time has elapsed without a claim of the digital asset. The predetermined period of time may be, for example, 30 days, 60 days, 90 days, 180 days, or another time duration. The period of time may be counted beginning with when the unique code is funded, in some embodiments. Alternatively, the period of time may be counted beginning from the first user providing an indication that the unique code has been conveyed to a second user. Block 606 may occur as an alternative of block 604, in some embodiments. In response to either block 604 or block 606, the method 600 may further include, at block 608, transferring the digital asset from the escrow account to the first user's account from which it was initially transferred to the escrow account. Where the digital asset is transferred in response to the predetermined period of time elapsing at block 606, the transfer may be automatic, without further intervention or action from the first user. Block 608 may include changing a state of the unique code associated with the cancellation to cancelled (if through block 604) or expired (if through block 606), in some embodiments.

The method 600 may further include, at block 610, receiving a scan of the unique code from a second user after the code has been marked as expired or cancelled. The scan from the second user may be substantially similar to receiving a scan at block 402 of the method 400.

The method 600 may further include, at block 612, referring the second user to the first user in response to receiving the scan of the expired or cancelled code. For example, the second user may be provided with a name, email address, etc. for the first user, with a note that the code is expired or cancelled and that the second user should inquire about the code with the first user. Additionally or alternatively, block 612 may include notifying the first user associated with the expired of cancelled unique code that a second user has attempted to claim the unique code, and information respective of the attempted claiming user may be provided to the first user.

Figure 7:
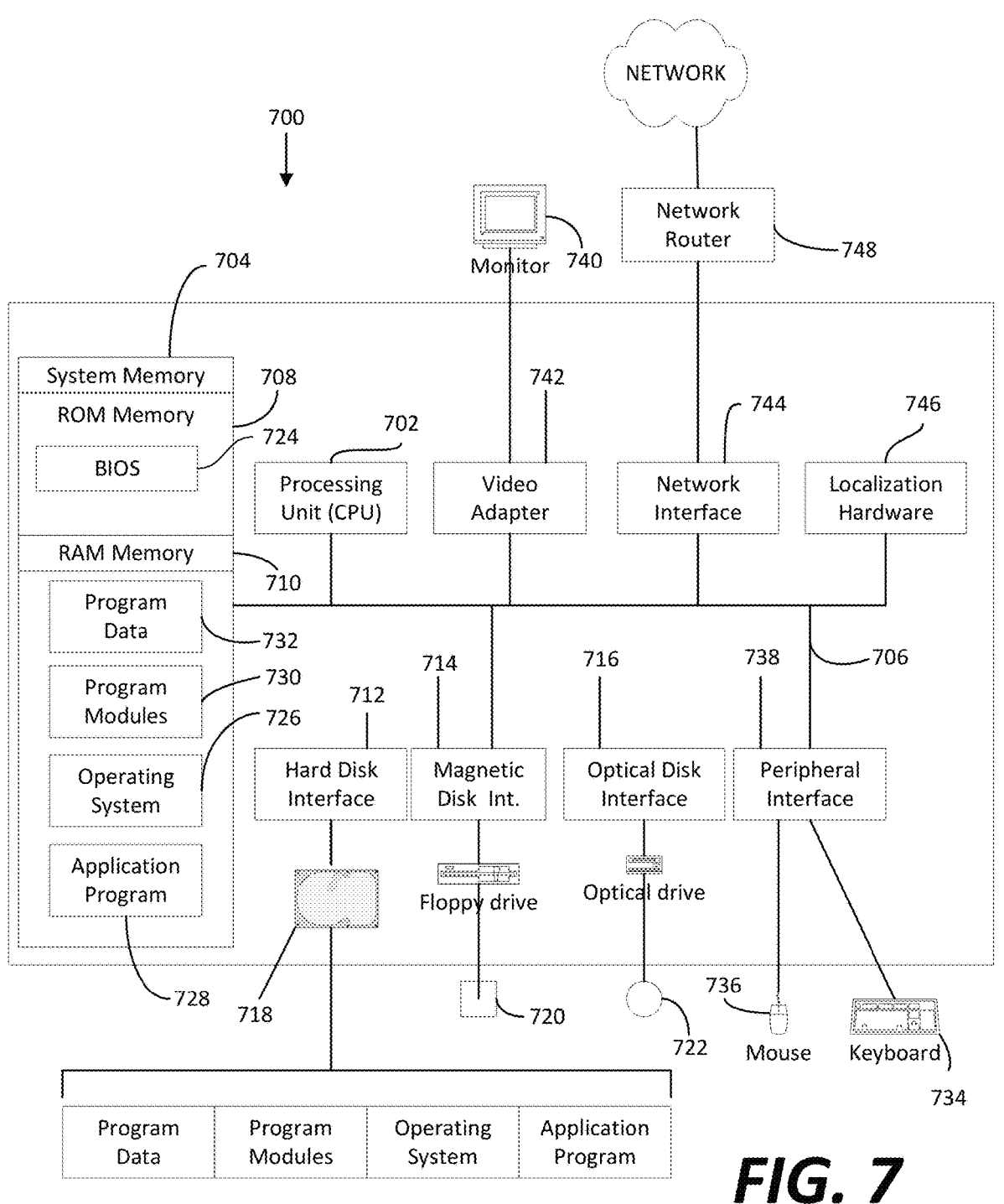
FIG. 7 is a block diagram view of an example computing environment.

FIG. 7 is a block diagram of an example computing system 700, such as a desktop computer, laptop, smartphone, tablet, or any other such device having the ability to execute instructions, such as those stored within a non-transient, computer-readable medium. Furthermore, while described and illustrated in the context of a single computing system 700, those skilled in the art will also appreciate that the various tasks described hereinafter may be practiced in a distributed environment having multiple computing systems 700 linked via a local or wide-area network in which the executable instructions may be associated with and/or executed by one or more of multiple computing systems 700.

In its most basic configuration, computing system environment 700 typically includes at least one processing unit 702 and at least one memory 704, which may be linked via a bus 706. Depending on the exact configuration and type of computing system environment, memory 704 may be volatile (such as RAM 710), non-volatile (such as ROM 708, flash memory, etc.) or some combination of the two. Computing system environment 700 may have additional features and/or functionality. For example, computing system environment 700 may also include additional storage (removable and/or non-removable) including, but not limited to, magnetic or optical disks, tape drives and/or flash drives. Such additional memory devices may be made accessible to the computing system environment 700 by means of, for example, a hard disk drive interface 712, a magnetic disk drive interface 714, and/or an optical disk drive interface 716. As will be understood, these devices, which would be linked to the system bus 706, respectively, allow for reading from and writing to a hard disk 718, reading from or writing to a removable magnetic disk 720, and/or for reading from or writing to a removable optical disk 722, such as a CD/DVD ROM or other optical media. The drive interfaces and their associated computer-readable media allow for the nonvolatile storage of computer readable instructions, data structures, program modules and other data for the computing system environment 700. Those skilled in the art will further appreciate that other types of computer readable media that can store data may be used for this same purpose. Examples of such media devices include, but are not limited to, magnetic cassettes, flash memory cards, digital video-disks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 700.

A number of program modules may be stored in one or more of the memory/media devices. For example, a basic input/output system (BIOS) 724, containing the basic routines that help to transfer information between elements within the computing system environment 700, such as during start-up, may be stored in ROM 708. Similarly, RAM 710, hard drive 718, and/or peripheral memory devices may be used to store computer executable instructions comprising an operating system 726, one or more applications programs 728, other program modules 730, and/or program data 732. Still further, computer-executable instructions may be downloaded to the computing environment 700 as needed, for example, via a network connection. The applications programs 728 may include, for example, the asset transfer module 116 and/or the encryption and key management module 118.

An end-user may enter commands and information into the computing system environment 700 through input devices such as a keyboard 734 and/or a pointing device 736. While not illustrated, other input devices may include a microphone, a joystick, a game pad, a scanner, etc. These and other input devices would typically be connected to the processing unit 702 by means of a peripheral interface 738 which, in turn, would be coupled to bus 706. Input devices may be directly or indirectly connected to processor 702 via interfaces such as, for example, a parallel port, game port, firewire, or a universal serial bus (USB). To view information from the computing system environment 700, a monitor 740 or other type of display device may also be connected to bus 706 via an interface, such as via video adapter 742. In addition to the monitor 740, the computing system environment 700 may also include other peripheral output devices, not shown, such as speakers and printers.

The computing system environment 700 may also utilize logical connections to one or more computing system environments. Communications between the computing system environment 700 and the remote computing system environment may be exchanged via a further processing device, such a network router 748, that is responsible for network routing. Communications with the network router 748 may be performed via a network interface component 744. Thus, within such a networked environment, e.g., the Internet, World Wide Web, LAN, or other like type of wired or wireless network, it will be appreciated that program modules depicted relative to the computing system environment 700, or portions thereof, may be stored in the memory storage device(s) of the computing system environment 700.

The computing system environment 700 may also include localization hardware 746 for determining a location of the computing system environment 700. In embodiments, the localization hardware 746 may include, for example only, a GPS antenna, an RFID chip or reader, a WiFi antenna, or other computing hardware that may be used to capture or transmit signals that may be used to determine the location of the computing system environment 700.

In a first aspect of the present disclosure, a method is provided that includes receiving, by a computing system from a first user device, a first request to access an electronic interface associated with a unique code, the unique code associated with a physical medium; serving, by the computing system to the first user device in response to the first request, the electronic user interface; receiving, by the computing system from the first user device through the electronic user interface, a first identification of a digital asset; transferring, by the computing system in response to the first identification, the digital asset from a first electronic storage that is associated with the first user device to a second electronic storage; receiving, by the computing system from a second user device, a second request to access the electronic interface associated with the unique code; serving, by the computing system to the second user device in response to the second request, the electronic user interface; receiving, by the computing system from second user device through the electronic user interface, a second identification of a third electronic storage that is associated with the second user device; and transferring, by the computing system in response to the second identification, the digital asset from the second electronic storage to the third electronic storage.

In an embodiment of the first aspect, the unique code is a QR code.

In an embodiment of the first aspect, the method further includes receiving, by the first user device, the unique code as input; and transmitting, by the first user device, the first request according to information embedded in the unique code. In a further embodiment of the first aspect, receiving the unique code as input includes receiving an image of a token including the code and interpreting the token. In a further embodiment of the first aspect, the method further includes receiving, by the second user device, the unique code as input by the second user device; and transmitting, by the second user device, the second request according to information embedded in the unique code.

In an embodiment of the first aspect, serving the electronic user interface to the first user device in response to the first request includes populating the interface with a first input portion for the first user device to identify the digital asset and a second input portion for the first user device to select at least one additional item of content; and serving the electronic user interface to the second user device in response to the second request includes populating the interface with a listing of the digital asset and the at least one additional item of content.

In an embodiment of the first aspect, the digital asset includes one or more of currency; cryptocurrency; a non-fungible token; or a file.

In an embodiment of the first aspect, serving the electronic user interface includes selecting a version of the electronic user interface according to at least one of the unique code or a batch identifier received with the first request.

In a second aspect of the present disclosure, a computing system is provided that includes a processor; and a non-transitory computer-readable memory storing instructions that, when executed by the processor, cause the computing system to perform operations including: receiving, from a user device, a request to access an electronic interface associated with a unique code, the request including the unique code; serving, to the user device in response to the request, the electronic user interface; receiving, from the user device through the electronic user interface, an identification of a digital asset; transferring, in response to the identification, the digital asset from a first electronic storage that is associated with the user device to a second electronic storage according to the unique code; determining that a predetermined period of time has elapsed with the digital asset in the second storage; and based on the determination, automatically transferring the digital asset from the second storage to the first storage.

In an embodiment of the second aspect, the user device is a first user device; the request is a first request; the unique code is a first unique code; the identification is a first identification; the digital asset is a first digital asset; and the operations further include: receiving, from a second user device, a second request to access the electronic interface, the second request including a second unique code; serving, to the second user device in response to the second request, the electronic user interface; receiving, from the second user device through the electronic user interface, a second identification of a second digital asset; and transferring, in response to the second identification, the second digital asset from a third electronic storage that is associated with the second user device to the second electronic storage. In a further embodiment of the second aspect, the operations further include: receiving a third request to access the electronic interface, the third request including the second unique code; serving, by the computing system to the second user device in response to the second request, the electronic user interface; receiving, by the computing system from second user device through the electronic user interface, a second identification of a third electronic storage that is associated with the second user device; and transferring, by the computing system in response to the second identification, the digital asset from the second electronic storage to the third electronic storage.

In an embodiment of the second aspect, the user device is a first user device; the request is a first request; the unique code is a first unique code; the identification is a first identification; the digital asset is a first digital asset; and the operations further include: receiving, from a second user device, a second request to access the electronic interface, the second request including a second unique code; serving, to the second user device in response to the second request, the electronic user interface; receiving, from the second user device through the electronic user interface, a second identification of a second digital asset; and transferring, in response to the second identification, the second digital asset from a third electronic storage that is associated with the second user device to the second electronic storage. In a further embodiment of the second aspect, the operations further include: receiving, from the second user device, a request to recall the second digital asset; and in response to the request to recall, transferring the second digital asset from the second electronic storage to the third electronic storage. In a further embodiment of the second aspect, the operations further include: receiving a third request from a third user device to access the electronic interface, the third request including the second unique code; serving, by the computing system to the third user device in response to the second request, the electronic user interface; and indicating, to the third user device through the electronic user interface, that the second digital asset has been recalled In a third aspect of the present disclosure, a method is provided that includes receiving, by a computing system, a plurality of unique tokens, each unique token encoding a respective unique code and an address to access an electronic user interface; causing a respective one of the plurality of unique tokens to be applied to a respective unit of physical media; receiving, by the computing system, from each of a plurality of first user devices, respective first requests to access an electronic user interface, each first request including a respective one of the plurality of unique codes; receiving, from each first user through the electronic user interface, a respective digital asset, whereby a plurality of digital assets are received from a plurality of first users; storing, by the computing system, the plurality of digital assets in a common digital repository, each digital asset stored in connection with the respective unique code received from the respective first user; receiving, by the computing system, from each of a plurality of second user devices, respective second requests to access the electronic user interface, each second request including a respective one of the plurality of unique codes; and transferring, to a respective second user each of the respective second user devices, the digital asset stored in connection with the respective unique code received from the second user device.

In an embodiment of the third aspect, each unique token further encodes a batch identifier from a plurality of batch identifiers and each first request includes a respective one of the plurality of batch identifiers, wherein the method further includes: selecting, according to each batch identifier, a respective version of an electronic user interface from a plurality of versions of the electronic user interface; and serving, in response to each first request, the respective selected version of the electronic user interface.

In an embodiment of the third aspect, each unique token further encodes a batch identifier from a plurality of batch identifiers and each first request includes a respective one of the plurality of batch identifiers, wherein the method further includes: causing a plurality of cryptographic keys to be generated, each associated with a respective batch identifier; and decoding each received unique code according to a respective cryptographic key of the plurality of cryptographic keys associated with the received batch identifier.

In an embodiment of the third aspect, the method further includes marking each unique code as expired after transferring the digital asset stored in connection with the respective unique identifier.

In an embodiment of the third aspect, the method further includes determining, in response to one of the second requests, that the respective second user is not associated with an account for receiving the respective digital asset and, in response, prompting the second user to create an account.

In an embodiment of the third aspect, the method further includes determining, for each first request, that the received unique identifier is not associated with a stored digital asset; and in response to the determination, serving a provider version of an electronic user interface to the respective first user device.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A method comprising:
   receiving responsive to scanning a token associated with a physical medium, by a computing system from a first user device, a first request to access an electronic interface associated with a unique code encoded as part of the token, at least one batch identifier included as part of the token;
   selecting, by the computing device, a decryption key from a plurality of decryption keys specific to the at least one batch identifier included as part of the token,
   decrypting using the decryption key, by the computing system, a portion of the unique code;
   determining, by the computing system in response to the first request, that the unique code has a first status;
   serving, by the computing system to the first user device in response to the first request and in response to determining that the unique code has the first status, a version of the electronic user interface that enables the first user device to designate a digital asset for transfer;
   receiving, by the computing system from the first user device through the electronic user interface, a first identification of a digital asset; and
   transferring, by the computing system in response to the first identification, the digital asset from a first electronic storage that is associated with the first user device to a second electronic storage.

2. The method of claim 1, wherein the unique code is a quick response (QR) code.

3. The method of claim 1, further comprising:
   receiving, by the first user device, the unique code as input; and
   transmitting, by the first user device, the first request according to information embedded in the unique code.

4. The method of claim 3, wherein receiving the unique code as input comprises receiving an image of a token comprising the code and interpreting the token.

5. The method of claim 3, further comprising:
   receiving, by the second user device, the unique code as input by the second user device; and transmitting, by the second user device, the second request according to information embedded in the unique code.

6. The method of claim 1, wherein:

serving the electronic user interface to the first user device in response to the first request comprises populating the interface with a first input portion for the first user device to identify the digital asset and a second input portion for the first user device to select at least one additional item of content; and serving the electronic user interface to the second user device in response to the second request comprises populating the interface with a listing of the digital asset and the at least one additional item of content.

7. The method of claim 1, wherein the digital asset comprises one or more of:

currency;

cryptocurrency;

a non-fungible token; or a file.

8. The method of claim 1, wherein serving the electronic user interface comprises selecting a version of the electronic user interface according to at least one of the unique code or a batch identifier received with the first request.

9. A computing system comprising:

a processor; and a non-transitory computer-readable memory storing instructions that, when executed by the processor, cause the computing system to perform operations comprising:

receiving responsive to scanning a token associated with a physical medium, from a user device, a request to access an electronic interface associated with a unique code encoded as part of the token, a batch identifier being included as part of the token;

selecting a decryption key from a plurality of decryption keys specific to the batch identifier;

decrypting, using the decryption key, a portion of the unique code;

serving, to the user device in response to the request, the electronic user interface;

receiving, from the user device through the electronic user interface, an identification of a digital asset;

transferring, in response to the identification, the digital asset from a first electronic storage that is associated with the user device to a second electronic storage according to the unique code;

determining that a predetermined period of time has elapsed with the digital asset in the second storage; and based on the determination, automatically returning the digital asset from the second storage to the first storage.

10. The computing system of claim 9, wherein:

the user device is a first user device;

the request is a first request;

the unique code is a first unique code;

the identification is a first identification;

the digital asset is a first digital asset; and the operations further comprise:

receiving, from a second user device, a second request to access the electronic interface, the second request including a second unique code;

serving, to the second user device in response to the second request, the electronic user interface;

receiving, from the second user device through the electronic user interface, a second identification of a second digital asset; and transferring, in response to the second identification, the second digital asset from a third electronic storage that is associated with the second user device to the second electronic storage.

11. The computing system of claim 10, wherein the operations further comprise:

receiving a third request to access the electronic interface, the third request including the second unique code;

serving, by the computing system to the second user device in response to the second request, the electronic user interface;

receiving, by the computing system from second user device through the electronic user interface, a second identification of a third electronic storage that is associated with the second user device; and transferring, by the computing system in response to the second identification, the digital asset from the second electronic storage to the third electronic storage.

12. The computing system of claim 9, wherein:

the user device is a first user device;

the request is a first request;

the unique code is a first unique code;

the identification is a first identification;

the digital asset is a first digital asset; and the operations further comprise:

receiving, from a second user device, a second request to access the electronic interface, the second request including a second unique code;

serving, to the second user device in response to the second request, the electronic user interface;

receiving, from the second user device through the electronic user interface, a second identification of a second digital asset; and transferring, in response to the second identification, the second digital asset from a third electronic storage that is associated with the second user device to the second electronic storage.

13. The computing system of claim 12, wherein the operations further comprise:

receiving, from the second user device, a request to recall the second digital asset; and in response to the request to recall, transferring the second digital asset from the second electronic storage to the third electronic storage.

14. The computing system of claim 13, wherein the operations further comprise:

receiving a third request from a third user device to access the electronic interface, the third request including the second unique code;

serving, by the computing system to the third user device in response to the second request, the electronic user interface; and indicating, to the third user device through the electronic user interface, that the second digital asset has been recalled.

15. A method comprising:

receiving, by a computing system, a plurality of unique tokens, each unique token encoding a respective unique code, a respective batch identifier, and an address to access an electronic user interface;

causing a respective one of the plurality of unique tokens to be applied to a respective unit of physical media;

selecting, by the computing system, a plurality of respective decryption keys for the plurality of unique tokens, each respective decryption key of the plurality of decryption keys being specific to a respective batch identifier of each unique token of the plurality of unique tokens;

decrypting, by the computing system, each respective unique code encoded in each unique token of the plurality of unique tokens using each respective decryption key;

receiving, by the computing system, from each of a plurality of first user devices, respective first requests to access an electronic user interface, each first request including a respective one of the plurality of unique codes;

receiving, from each first user through the electronic user interface, a respective digital asset, whereby a plurality of digital assets are received from a plurality of first users;

storing, by the computing system, the plurality of digital assets in a common digital repository, each digital asset stored in connection with the respective unique code received from the respective first user;

receiving, by the computing system, from each of a plurality of second user devices, respective second requests to access the electronic user interface, each second request including a respective one of a first subset of the plurality of unique codes; and transferring, to a respective second user each of the respective second user devices, the digital asset stored in connection with the respective unique code received from the second user device.

16. The method of claim 15, wherein each unique token further encodes a batch identifier from a plurality of batch identifiers and each first request includes a respective one of the plurality of batch identifiers, wherein the method further comprises:

selecting, according to each batch identifier, a respective version of an electronic user interface from a plurality of versions of the electronic user interface; and serving, in response to each first request, the respective selected version of the electronic user interface.

17. The method of claim 15, wherein each unique token further encodes a batch identifier from a plurality of batch identifiers and each first request includes a respective one of the plurality of batch identifiers, wherein the method further comprises:

causing a plurality of cryptographic keys to be generated, each associated with a respective batch identifier; and decoding each received unique code according to a respective cryptographic key of the plurality of cryptographic keys associated with the received batch identifier.

18. The method of claim 15, further comprising marking each unique code as expired after transferring the digital asset stored in connection with the respective unique identifier.

19. The method of claim 15, further comprising:

determining, in response to one of the second requests, that the respective second user is not associated with an account for receiving the respective digital asset and, in response, prompting the second user to create an account.

20. The method of claim 15, further comprising:

determining, for each first request, that the received unique identifier is not associated with a stored digital asset; and in response to the determination, serving a provider version of an electronic user interface to the respective first user device.

* * * * *